Figure 1:
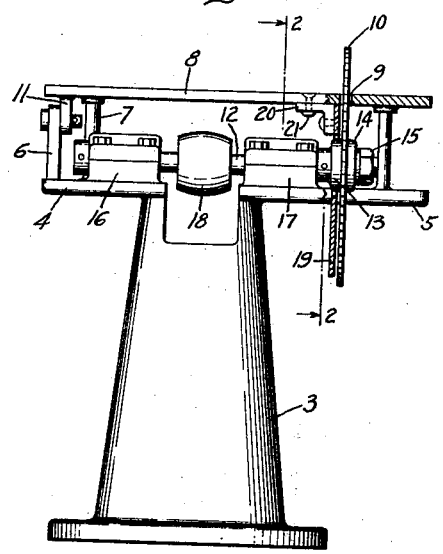

Aug. 23, 1932.   J. T. H. DEMPSTER   1,873,700
CIRCULAR SAW
Filed May 1, 1931

Inventor:
John T. H. Dempster,
by Charles V. Mullan
His Attorney.

Patented Aug. 23, 1932

1,873,700

UNITED STATES PATENT OFFICE

JOHN T. H. DEMPSTER, OF SCHENECTADY, NEW YORK, ASSIGNOR TO GENERAL ELECTRIC COMPANY, A CORPORATION OF NEW YORK

CIRCULAR SAW

Application filed May 1, 1931. Serial No. 534,359.

The present invention relates to rotating disks, particularly of the kind which are used for sawing purposes, although it is not necessarily limited thereto.

It is well known to those skilled in the art that injury frequently occurs to such disks in the form of cracks, mostly caused by more or less violent vibrations to which the disks are subjected, particularly while running at high speed.

The cause of such vibrations lies in the fact that these disks are generally in an unbalanced condition. The latter may be inherent in the disks themselves or caused during working operation. In the case of a saw disk, for instance, the unbalance may be caused by the fact that the different parts of the disk are subjected to different changes of temperature, particularly in radial direction of the disk, while the disk is in engagement with a piece to be worked on. The differences in temperature of the different parts of the disk naturally effect vibrations of the disk and if the amplitudes of such vibrations are of sufficient value to cause stresses and strains of the materials which exceed the fatigue limit thereof, cracking of the materials will result.

The object of my invention accordingly consists in an improved arrangement for rotary disks by which such injury is effectively prevented. The desired result is accomplished, acording to my invention, by the provision of means for damping the vibration of said disks.

For a consideration of what I believe to be novel and my invention, attention is directed to the following description and claims in connection with the drawing appended hereto.

Figure 2:
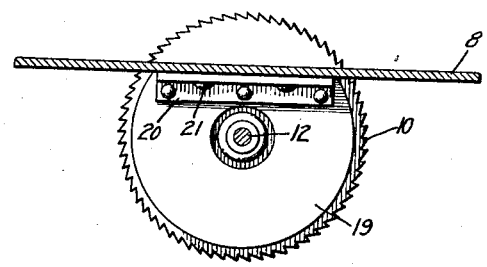

In the drawing, Fig. 1 illustrates by way of example, a circular saw embodying my invention, and Fig. 2 shows a cross sectional view along lines 2—2 of Fig. 1.

Referring to Fig. 1, 3 represents a pedestal having lateral arms 4 and 5 to which supports 6 and 7 are secured. 8 represents a saw table having a slot 9 through which a circular saw disk 10 projects. The saw table 8 rests on support 7 and is secured to supports 6 by means of hinges 11.

The saw disk 10 is fastened to a shaft 12 by suitable means, in the present instance shown as rings 13 and 14, and nut 15. 16 and 17 are two bearings for the shaft and 18 represents a pulley for driving said shaft and disk by any suitable means, not shown in the drawing. The saw table 8 can be turned about its hinges 11 whereby the saw disk 10 may be easily assembled and disassembled. The arrangement so far described may be taken as typical of any circular saw construction.

According to my invention, as shown in the present instance, I provide a means spaced close to a sufficient area of the rotary disk in order to prevent appreciable vibration of said disk. In the present instance I have shown such means in the form of a single plate 19 provided on one side of the saw disk and secured by means of an angle iron 20 and screws 21 beneath the saw table. Said plate covers a sufficient area, that is, approximately 180° of the angular area of the saw disk and is of a diameter less than the diameter of said saw disk. The plate 19 is preferably provided with a rough surface adjacent the saw disk and mounted at a distance of about 1/64 of an inch from the surface of said disk. It will be readily understood that plate 19 defines with saw disk 10 an air cushion between both disks which is adapted to eliminate or at least to considerably damp vibration of the saw disk.

What I claim as new and desire to secure by Letters Patent of the United States, is:—

1. The combination with a rotary disk and means for mounting and rotating said disk comprising a saw table, of means covering at least 120 angular degrees of said disk and mounted close to said disk beneath the saw table and being adapted to prevent vibration of said disk.

2. The combination with a rotary disk and means for mounting and rotating said disk comprising a saw table, of a plate mounted close to said disk beneath the saw table and covering approximately 180 angular degrees of said disk and being adapted to prevent vibration of said disk.

3. A circular saw comprising a saw disk, means for mounting and rotating said saw disk comprising a saw table, a plate having a rough surface adjacent said saw disk and being mounted close to said saw disk beneath the saw table and covering approximately 180 angular degrees of said disk and being adapted to prevent vibration of said disk.

4. A circular saw comprising a saw disk, means for mounting and rotating said disk, a plate having a rough surface adjacent said saw disk at a distance of the order of 1/64 of an inch from the adjacent surface of said saw disk and having a maximum diameter less than the diameter of said saw disk, said plate being out of the path of the piece being sawed.

5. A circular saw comprising a saw disk, means for mounting and rotating said disk, a plate forming a segment of a diameter less than the diameter of said saw disk and being secured to said mounting means at a distance of the order of 1/64 of an inch from the adjacent surface of said saw disk defining an air cushion between said plate and disk adapted to damp vibration of said disk, said plate being out of the path of the piece being sawed.

In witness whereof, I have hereunto set my hand.

JOHN T. H. DEMPSTER.